(12) United States Patent
Tamil et al.

(10) Patent No.: US 7,251,416 B1
(45) Date of Patent: Jul. 31, 2007

(54) CONTAINER BASED CROSSCONNECT

(75) Inventors: Lakshman S. Tamil, Plano, TX (US); Glen Collier, Plano, TX (US); Mitch Entezari, Highland Village, TX (US); Allesandro Fabbri, Richardson, TX (US); Gopalakrishnan Hari, Plano, TX (US); Justin Hunt, Wylie, TX (US); Quan Jiang, Plano, TX (US); Bing Li, San Diego, CA (US); Lee McFearin, Plano, TX (US); Joseph M. McQuade, Gilbert, AZ (US); Earl Ponceti, McKinney, TX (US); Scott A. Rothrock, Ashburn, VA (US); Frederick A. Rush, Austin, TX (US); Alexander A. Smith, Cupertino, CA (US); David Wolf, Allen, TX (US)

(73) Assignee: Yotta networks, LLC, Greenbrac, CA (US)

( * ) Notice: Subject to any disclaimer, the term of this patent is extended or adjusted under 35 U.S.C. 154(b) by 708 days.

(21) Appl. No.: 10/431,795

(22) Filed: May 8, 2003
(Under 37 CFR 1.47)

Related U.S. Application Data

(60) Provisional application No. 60/378,887, filed on May 8, 2002.

(51) Int. Cl.
*H04J 14/00* (2006.01)

(52) U.S. Cl. .......................... 398/47; 398/45; 398/48; 398/50; 398/51; 398/54; 370/351; 370/352; 370/355; 370/389

(58) Field of Classification Search .......... 398/43–102; 359/117, 123, 128; 370/351, 352–395, 395.4
See application file for complete search history.

(56) References Cited

U.S. PATENT DOCUMENTS 5,018,130 A * 5/1991 Suzuki et al. .................. 398/51

(Continued)

OTHER PUBLICATIONS

Ishida et al: Parallel-optical-interconnecting multiwavelength star network (POIMS Net) for high-capacity switching, ☐☐Electronics Letters, Sep. 1996, vol. 32, No. 19, p. 1804-1806.*

(Continued)

*Primary Examiner*—Kenneth Vanderpuye
*Assistant Examiner*—Li Liu
(74) *Attorney, Agent, or Firm*—Sprinkle IP Law Group

(57) ABSTRACT

Systems and methods for optical cross connects which switch data at a container (packet) level. In one embodiment, a plurality of optical switch edges are coupled to an optical switch core via a minimal number of optical fibers. The switch core is configured to optically switch data from an ingress edge to one of a plurality of egress edges in a nonblocking fashion. The ingress edge receives data streams and distributes the data among a plurality of container processors. Each of these container processors produces an optical signal of a different wavelength, which can then be multiplexed with others to form a multiple-wavelength optical signal that is transmitted to the switch core. The switch core then switches successive portions (containers) of the multiple-wavelength signal to the egress edges to which they are respectively destined. The respective egress edges perform the reverse of this process to form output data signals.

18 Claims, 6 Drawing Sheets

U.S. PATENT DOCUMENTS

| | | | |
|---|---|---|---|
| 5,475,679 A * | 12/1995 | Munter | 370/395.4 |
| 5,892,604 A * | 4/1999 | Yamanaka et al. | 398/48 |
| 5,905,587 A * | 5/1999 | Maeno et al. | 398/45 |
| 6,243,178 B1 * | 6/2001 | Suemura et al. | 398/56 |
| 6,609,840 B2 * | 8/2003 | Chow et al. | 398/102 |
| 6,721,315 B1 * | 4/2004 | Xiong et al. | 370/389 |
| 6,826,368 B1 * | 11/2004 | Koren et al. | 398/50 |
| 6,934,471 B1 * | 8/2005 | Carvey et al. | 398/45 |
| 7,042,883 B2 * | 5/2006 | Fan et al. | 370/395.4 |
| 2001/0017866 A1 * | 8/2001 | Takada et al. | 370/535 |
| 2002/0075540 A1 * | 6/2002 | Munter | 359/128 |
| 2002/0191588 A1 * | 12/2002 | Personick | 370/352 |
| 2004/0018016 A1 * | 1/2004 | O'Mahony et al. | 398/43 |

OTHER PUBLICATIONS

Chlamtac et al: a fair slot routing solution for scalability in all-optical packet switched networks, ☐☐Journal of High Speed Networks, vol. 6, issue 3, 1997, p. 181-196.*

Xue et al: "Self-similar Traffic Shaping at the Edge Router in. Optical Packet-switched Networks", IEEE ICC 2002, Apr. 28-May 2, New York 2002 et al, p. 2449-2453.*

* cited by examiner

CONTAINER BASED CROSSCONNECT

RELATED APPLICATIONS

This application claims priority from U.S. Provisional Patent Application No. 60/378,887, entitled Highly Scalable Container-Based Cross Connect and Data Transport Method, filed on May 8, 2002 by Mitch Entezari, et al., which provisional patent application is incorporated by reference as if set forth herein in its entirety.

FIELD OF THE INVENTION

The present invention relates generally to data communications and more particularly to systems and methods for switching high-speed optical data streams to a plurality of destinations.

BACKGROUND OF THE INVENTION

In recent years, a considerable amount of optical fiber has been added to the global communications infrastructure. While optical fiber provides a great deal more bandwidth than a comparable conventional wire cable, continuing increases in the available bandwidth are necessary. This is driven in part by the exponential growth in IP traffic.

In response to the increased demand for bandwidth, communications carriers and equipment vendors are researching means for simplifying the global communications infrastructure. One of the areas of research relates to means for bringing the IP and SONET/SDH transport layers closer to the common optical transport layer and efficiently supporting the exponential bandwidth demands. Solutions in this area are anticipated to be very cost-effective.

Currently available switching products are usually based on 2n electrical switching fabric. One problem with these products is the scalability of the systems. Although the bandwidth and speed of these systems continues to increase, they are not expected to be able to meet the bandwidth demands of the future. Even if these demands could be met, it is anticipated that the many interconnects and fabric elements required in a terabit electrical switching fabric would present an operational nightmare in terms of the provisioning and management of the system.

Another problem with these systems is that, the per port fabric bandwidth is at least two orders of magnitude slower than the photonic switches. Electrical fabrics can currently handle a bandwidth of about 2.5 Gbps, while photonic switching elements can switch over 40-nm of optical bandwidth with multiple parallel optical frequencies, each with a modulation rate exceeding 10 Gbps, resulting in per port fabric bandwidths exceeding 450 Gbps. Thus, the throughput of an electrical switching fabric will be substantially lower than a comparable photonic switching fabric. Furthermore, optical fabrics can be reconfigured on the order of nanoseconds.

A related problem is that, even though photonic switches have the potential to operate at much higher data rates than electrical switches, it is very difficult to implement a photonic switch at these data rates. As a result of these difficulties, photonic switching systems in the prior art do not switch data at the packet level. Instead, connections are maintained from a particular set of ingress ports to a particular set of egress ports. These connections remain in place for long periods of time (e.g., hours or even days). It should be noted that, in order to implement switching at the packet level using prior art systems and methods, the routing of data from the ingress ports of the edges to the switch core and then out through the egress ports of the edges would have required individual optical fibers for each of the ports, thereby limiting the scalability of the switching system.

SUMMARY OF THE INVENTION

One or more of the problems outlined above may be solved by the various embodiments of the invention. Broadly speaking, the invention comprises systems and methods for scalable optical cross connects. In one embodiment, a plurality of optical switch edges are coupled to an optical switch core via optical fibers. The switch core is configured to optically switch (route) data from an ingress edge to one of a plurality of egress edges in a nonblocking fashion. The ingress edge has a plurality of ports through which incoming data is received. The incoming data from each of the ports is distributed among a plurality of data container generators. Each of these data container generators packages data in containers (similar to packets) and produces an optical signal of a different wavelength. These signals are combined into a multiple-wavelength optical signal that is transmitted to the switch core, which then switches successive portions of the multiple-wavelength optical signal to the egress edges to which they are respectively addressed. The respective egress edges then separate the multiple-wavelength optical signal into a plurality of single-wavelength optical signals. Each of these single-wavelength optical signals is then demultiplexed and successive portions of the signals are switched to the respective ports to which they are addressed. The data switched to each port is then output as a single data signal.

In one embodiment, the invention comprises a switching system for switching data between a plurality of ingress ports and a plurality of egress ports. Data from each of the ingress ports is switched to a plurality of edge container processors. These processors collect the data and package it in containers, wherein all of the data in a particular container is destined for the same egress edge. The containers are then held in a buffer until they need to be forwarded to a switch core. The containers are forwarded from the buffer according to a switching schedule, wherein each container is in a time slot that is associated with the container's destination edge. The containers are forwarded in accordance with the predetermined schedule. The containers are forwarded through an edge container aggregator which multiplexes the containers from the different edge container processors. The multiplexed containers are passed through an edge amplification and protection unit before reaching the switch core. The switch core is configured to map each output to an input according to the schedule for the duration of the multiplexed containers. Following transit of the switch core, the multiplexed containers are sent through an amplification and protection unit. Then the multiplexed containers are demultiplexed into a plurality of container streams and received by edge container processors. The edge container processors unpackage each container and switch the data to a plurality of edge ports.

In another embodiment, the invention comprises a method in which data from a plurality of input data streams is collected and processed into containers, wherein each container contains data associated with a single destination edge. Some of the containers are multiplexed together. The containers are then transmitted to a switch core in timeslots defined by a predetermined switching schedule. The containers are switched by the switch core to the destination edges associated with the corresponding timeslots. Finally, the containers are deconstructed by the egress edges into output data streams.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1:
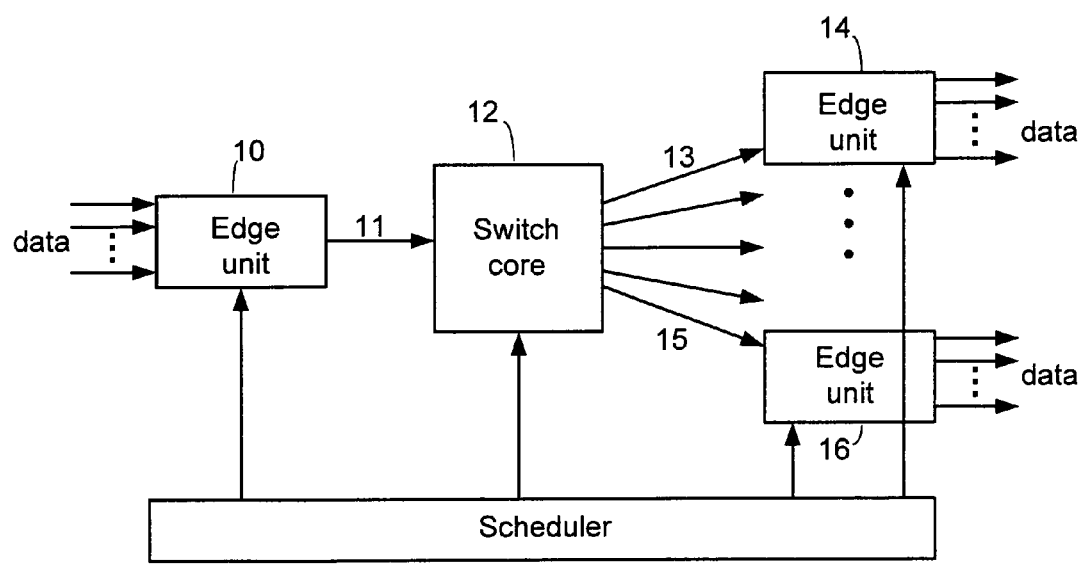
FIG. 1 is a diagram illustrating a high-level view of a photonic switching system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Broadly speaking, the invention comprises systems and methods for scalable optical cross connects. In one embodiment, a plurality of optical switch edges is coupled to an optical switch core via optical fibers. The switch core is configured to optically switch data from an ingress edge to one of a plurality of egress edges in a nonblocking fashion. The ingress edge has a plurality of ports through which incoming data is received. The incoming data from each of the ports is distributed among a plurality of optical signal generators. Each of these optical signal generators produces an optical signal of a different wavelength. These signals are combined into a multiple-wavelength optical signal that is transmitted to the switch core, which then switches successive portions of the multiple-wavelength optical signal to the egress edges for which they are respectively destined, according to a system-wide data flow map. The respective egress edges then separate the multiple-wavelength optical signal into a plurality of single-wavelength optical signals. Each of these single-wavelength optical signals is then processed and successive portions of the signals are switched to the respective ports for which they are destined according to the data flow map. The data switched to each port is then output as a single data signal.

This embodiment provides several advantages over conventional technologies. For example, as indicated above, electrical switching systems are limited to data rates of about 2.5 Gbps. This system, since it uses high-bandwidth optical switches that can operate at ns speed, can function at data rates of 400 Gbps, or even higher. Another advantage of this embodiment is that it uses the dense wavelength division multiplexing (DWDM) to transport data from the edges to the switch core and therefore enables the use of fewer optical fibers in making this connection. Still another advantage of this embodiment is that, wherein conventional optical data transmission systems employ [persistent connections], this system is capable of switching containers (data segments) to different destinations. These and/or other advantages may be provided in the various embodiments of the present invention.

Referring to FIG. 1, a diagram illustrating a high-level view of a photonic switching system in accordance with one embodiment is shown. As depicted in the figure, several streams of data are received by edge 10. The data contained in these streams is redistributed into several new streams of data within edge 10. Several optical signals are then generated by edge 10, each optical signal containing one of the new data streams and each having a different wavelength of light. These single-wavelength optical signals are combined into a single multiple-wavelength optical signal that is then transmitted via optical fiber 11 to optical switch core 12. Optical switch core 12 switches segments of the multiple-wavelength optical signal and switches them to their respective destination edges (e.g., 14, 16) via corresponding optical fibers (e.g., 13, 15). The switching of each segment is performed according to a predetermined (but programmable or modifiable) switching schedule.

FIG. 1 illustrates the transmission of data from a single ingress edge (10) to multiple egress edges (14, 16, etc.) In the preferred embodiment, the system is more complex—there are actually multiple ingress edges, all of which need to transmit data to the various egress edges. Moreover, each edge in this embodiment is configured to serve as both an ingress edge and an egress edge. While the operation of the system as illustrated in FIG. 1 accurately reflects the transmission of data from a given ingress edge to the egress edges, it should be noted that the switch core is configured to transmit the data from the ingress edges to the egress edges in a non-blocking fashion. In other words, at a given time, each of the ingress edges is connected via the switch core to one or more of the egress edges and can transmit its data to the corresponding egress edge without being blocked by a transfer between other ingress/egress edges.

The non-blocking operation of switch core 12 is achieved by taking all of the data received by edge 10 via the multiple input streams and distributing the data from the different input streams into "containers" of data which are then transmitted over interconnect 11 to switch core 12. The containers are then switched through switch core 12 according to a non-blocking schedule. The containers are then transmitted over interconnects 13-15 to the different egress edges 14-16. When a container is received at the corresponding destination egress edge, the data in the container is distributed to the edge's various ports according to the destinations of the data. The switching of the data at the container level provides a significant distinction from the prior art.

Figure 2:
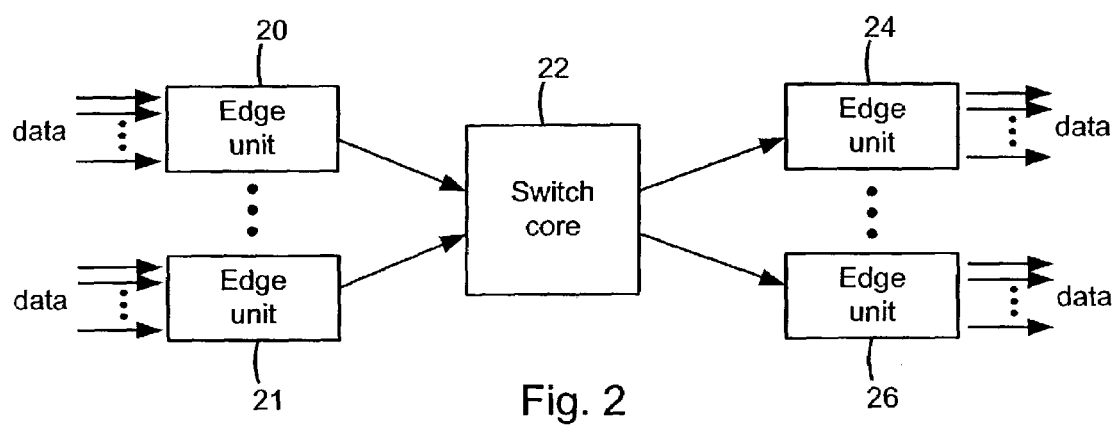
FIG. 2 is a diagram illustrating the switching of data from a plurality of ingress edges in one embodiment.

Referring to FIG. 2, a diagram illustrating the switching of data from a plurality of ingress edges is shown. In this embodiment, each ingress edge 20-21 receives data through a plurality of ingress ports. The data is processed within the edge unit and transformed into a single signal that is transmitted to switch core 22. The switch core switches the data from the ingress edge units to the egress edge units 24-26. In this embodiment, the data is multiplexed, so that successive containers of data (as will be discussed in more detail below) may be switched to different ones of the egress edge units. The data received by a given egress edge is then distributed to the appropriate egress ports.

Figure 3:
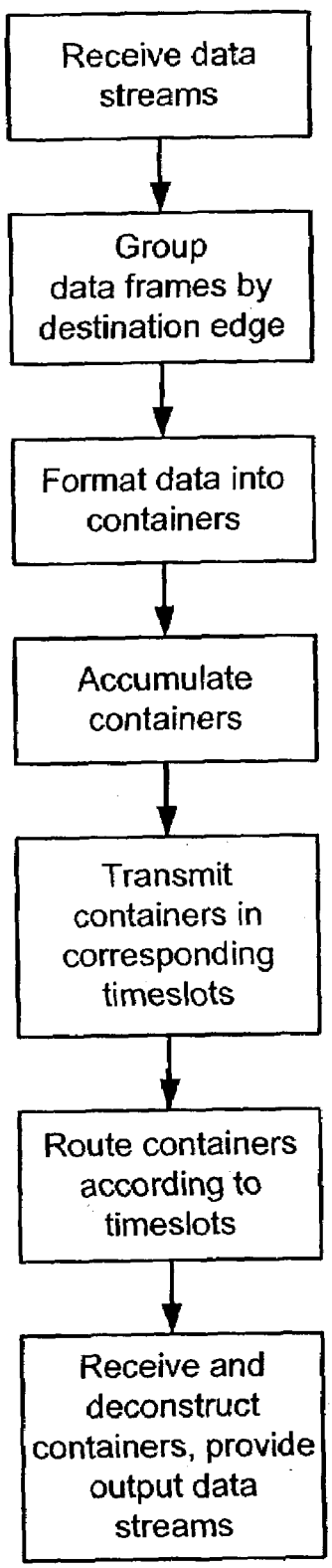
FIG. 3 is a flow diagram illustrating a method for container-based switching of data in accordance with one embodiment.

Referring to FIG. 3, a flow diagram illustrating a method for container-based switching of data in accordance with the embodiment described above is shown. In this embodiment, one or more data streams is received by each of a plurality of ingress edges. Data frames from each of the data streams are grouped by the corresponding destination edges and are formatted into containers, wherein each container holds data having a common destination edge. The containers are accumulated and are transmitted to a switch core in time slots defined by a switching schedule. In the preferred embodiment, containers embodied in different-wavelength optical signals are multiplexed into a single, multiple-wavelength optical signal. Containers received from a given edge in a given time slot are switched in a non-blocking manner to a destination edge defined by the switching schedule. The switching of the containers as defined by the schedule is repeated periodically (every 125 microseconds in the preferred embodiment). When the containers are received by the respective destination edges, they are deconstructed and switched to the appropriate destination ports within the edges and provided as output data streams.

Figure 4:
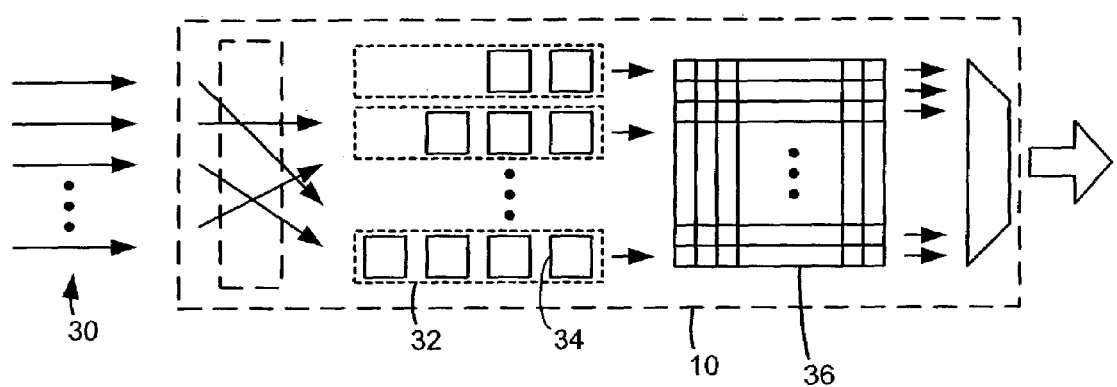
FIG. 4 is a diagram illustrating the distribution and packaging of data within an ingress edge in accordance with the embodiments of FIGS. 1 and 2.

Referring to FIG. 4, A diagram illustrating the distribution and packaging of data within an ingress edge in accordance with the embodiments of FIGS. 1 and 2 is shown. Data is received by the ingress edge in the form of a plurality of data streams 30, each of which is input through one of a plurality of ingress ports. Each data stream 30 may contain data that is destined for different ports of different egress edges. The received data is distributed to a plurality of buffers 32. Each buffer 32 collects data that is destined for a single egress edge. Data in buffers 32 is packaged into containers 34, wherein each container holds data for a single corresponding egress edge. (It should be noted that, in a broadcast or multicast mode, the containers may be destined for multiple edges.) The containers are aggregated and then transmitted to the switch core for switching to the appropriate egress edge. The aggregated containers are transmitted to the destination egress edges by transmitting them in time slots 36 that correspond to the destination egress edges. When the aggregated, containerized data is received by the egress edges, it is deconstructed into output data streams in a process that is essentially the reverse of the ingress edge processing.

Referring again to FIG. 3, a method for processing data in an edge unit in accordance with the embodiment described above is also illustrated. In this embodiment, a plurality of data streams are received by an ingress edge. The data streams are multiplexed and switched to a plurality of container generators. The container generators create containers in which the received data is embodied. In one embodiment, each container generator creates an optical data signal of a unique wavelength, wherein the optical data signal embodies the containers. Each of the generated containers includes only data having a common destination edge. The containers are aggregated and, at the appropriate times, are transmitted to a photonic switch core, which switches the containers to the corresponding destination edges. The destination edges receive the respective optical data signals embodying the containers and demultiplexes the signals, sending each wavelength to a corresponding component which deconstructs the received containers. The deconstructed containers are switched to the corresponding output data ports to form an output data stream.

Figure 5:
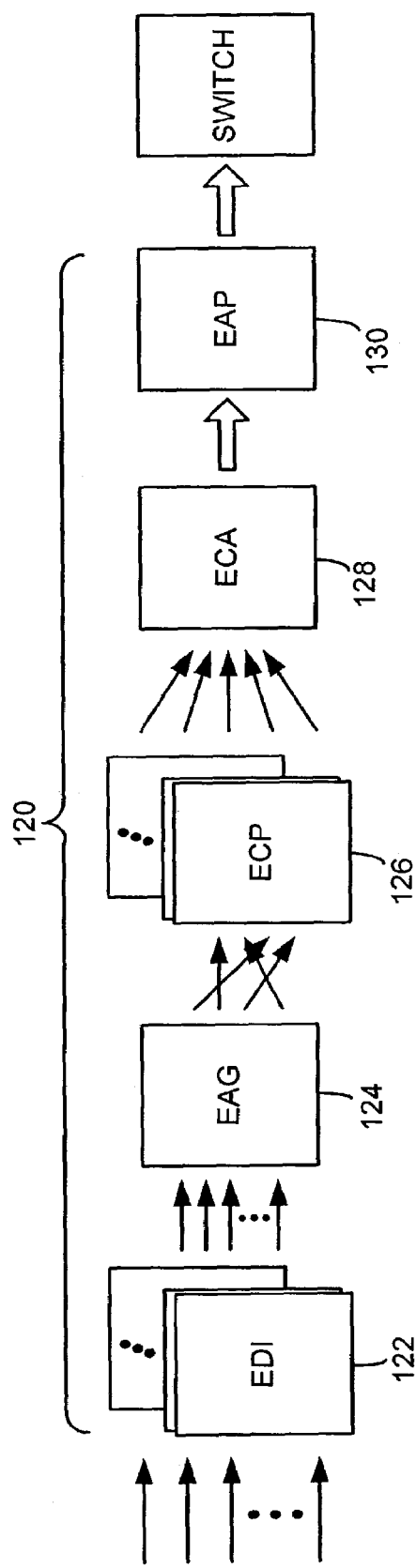
FIG. 5 is a diagram illustrating the structure of an ingress/egress edge unit in a preferred embodiment.

Referring to FIG. 5, a diagram illustrating the structure of an ingress/egress edge unit in one embodiment is shown. In this embodiment, edge unit 120 comprises a plurality of edge data interfaces 122, an edge adaptation and grooming component 124, a plurality of edge container processors 126, an edge container aggregation component 128 and an edge amplification and protection component 130. These components process the data flowing through edge unit 120. Edge unit 120 also includes an edge management and control component and an edge clock and synchronization component which are not explicitly shown in the figure.

Broadly speaking, the components of the edge unit function as follows. Edge data interfaces 122 simply provide an interface between edge adaptation and grooming component 124 and the sources of the data streams. Accordingly, edge data interfaces 122 may not be necessary in some embodiments. Edge adaptation and grooming component 124 serves to receive the data streams and to distribute the data contained therein to the plurality of edge container processors 126, each of which is associated with one or more different wavelengths of light. Edge container processors 126 create containers of data which hold the data received from edge adaptation and grooming component 124. All of the data within a container is destined for the same destination edge (or edges in case of multicast). The data containers created by edge container processors 126 are transmitted to edge container aggregation component 128. Edge container aggregation component 128 combines the containers from each of edge container processors 126 (each of which comprises one or more different wavelengths of light) into a single, multiple-wavelength container for each time slot in a switch schedule. The multiple-wavelength container is optionally amplified and/or protected by edge amplification and protection component 130 and is then provided to the switch core, which delivers the container to the destination edge. This process is repeated so that edge unit 120 provides a single, multiple-wavelength container to the switch core for each timeslot in the schedule.

The foregoing description of edge unit 120 illustrates the ingress-edge functionality of the edge unit. As noted above, the edge units in a preferred embodiment are configured to function as both ingress and egress edges. Accordingly, the components of edge unit 120 are configured to perform the reverse of the foregoing process in the context of the egress edge.

Edge Data Interface. The first component, or set of components of edge unit 120 is edge data interface(s) 122. The edge data interface is simply an interface to the I/O card(s) from which data is received. If the ingress edge is loosely coupled to a customer's system, the edge data interface provides a means for the data to be delivered from the customers I/O shelves to the edge adaptation and grooming component of the ingress edge. It should be noted that, if the ingress edge is tightly coupled to the customer's system, it may not be necessary to provide the interface function of the edge data interface components. It may therefore be possible to eliminate this component in some embodiments.

Edge Adaptation And Grooming Component. The next component of edge unit 120 is the edge adaptation and grooming component. In the preferred embodiment, the edge adaptation and grooming component is an STS-1 level electrical cross connect. The purpose of the edge adaptation and grooming component is to receive the input data and to distribute the data to the appropriate edge container processors. The edge adaptation and grooming component also grooms the data traffic to reduce the number of containers (and time slots) which are necessary to carry the data from the ingress edge to the corresponding egress edge. The edge adaptation and grooming component also serves to support the edge container processor protection function in some embodiments, in that it is configured to redirect data traffic from a failed edge container processor to the protection component upon occurrence of failure.

In one embodiment, the edge adaptation and grooming component is an STS-1 level electrical crossconnect capable of supporting up to 6144×7680 STS-1's from ingress to egress and 7680×6144 STS-1's from egress to ingress. It interfaces to the edge datapath interface or user interface (I/O) components and edge container processing components using the standard 2.488 G SONET compliant signals. In this embodiment, the edge adaptation and grooming component is capable of supporting up to 128 bidirectional 2.48 G signals to/from the edge data interface or i/o components and up to 160 bidirectional 2.48 G signals to/from the edge container processor components. The total number of 2.48 G signals between the edge adaptation and grooming component and edge container processor components depends on the number of edge container processor components required to support the specific system size.

The edge adaptation and grooming component is provided to distribute the user traffic across all the edge container processor components in order to groom all the traffic for a given edge and reduce the required number of container time slots through the photonic switch core from one edge to another edge. The edge adaptation and grooming component is also used to support the edge container processor protection switching function in certain embodiments. In case of edge container processor failure, all the traffic from/to the failed edge container processor must be redirected from/to the protection edge container processor. Each edge adaptation and grooming component is protected one-to-one.

Edge Container Processor. The next component of edge unit 120 is edge container processor 126. There are a plurality of edge container processors, each of which receives data from edge adaptation and grooming component 124. The edge container processors are configured to "containerize" or create containers which hold the data received from the edge adaptation and grooming component. A container is simply an aggregation of data, similar to a packet. Each edge container processor has one or more corresponding wavelengths and is configured to provide one or more output data signals at these wavelengths. Thus, the set of edge container processors generate parallel optical output data streams at their respective wavelengths. These output data streams are then provided to the edge container aggregation component 128.

In one embodiment, the edge container processor contains the unique processing required to utilize the photonic switch core. The input to this component is a collection of STS-48 signals received from the edge adaptation and grooming component. For an individual edge container processor, a total of 16 STS-48 signals are required. Each edge container processor receives 8 STS-48s of data from a working edge adaptation and grooming component and 8 STS-48s of data from a protection edge adaptation and grooming component. At each edge container processor, 4 STS-48s from each edge adaptation and grooming component are sent to the container transport ASIC. Inside the container transport ASIC, the processing required to modify the continuous stream of received data into the burst mode data to be transmitted through the core is performed. Each container transport ASIC can generate and process 195 containers each frame. Each frame is 125 microseconds long. The first 192 containers of each frame are directly mapped to the 192 (4×48) STS-1s from the edge adaptation and grooming component. The remaining three containers are generated internally by the ASIC for diagnostic and fault isolation purposes. From the container transport ASIC, the data is sent to a high-speed multiplexer, and then on to an optical transmitter. From the optical transmitter, the signal is transmitted to the edge container aggregation component. Because there are two edge container aggregation components, the signal is split, with one copy going to each of the edge container aggregation components.

As noted above, the edge units may function as both ingress edges and egress edges. In egress mode, two optical signals returning from the edge container aggregation component are delivered to two optical receivers. Each receiver converts the optical signals to electrical signals, and then forwards them to a burst receiver. Inside the burst receiver, clock recovery and data recovery is performed. The data is also demultiplexed to 16 bits. The 16 bits of data and the recovered clock signal are sent to the container transport ASIC. The ASIC restores the signal to a continuous stream and corrects errors that may be introduced through the core. The ASIC then sends 4 STS-48s back to the primary and secondary edge adaptation and grooming component, using independent links for each component. Each edge adaptation and grooming component is able to support up to 20 edge container processor (of which 19 are typically working and one is for protection). In one embodiment, the working edge container processor will use fixed-wavelength lasers, while the protect component will use tunable lasers.

Edge Container Aggregation Component. The next component of edge unit 120 is the edge container aggregation component. The edge container aggregation component serves to aggregate the containers by multiplexing the signals from the different edge container processor into a single, multiple-wavelength signal. In other words, the signal is wavelength-multiplexed, wherein the signal transmitted by the edge unit has multiple components, each having a different wavelength.

Edge Amplification And Protection Component. The edge amplification and protection component is configured to amplify the wavelength multiplexed signal produced by the edge container aggregation component and to protect the signal as needed. The optical signal from the edge amplification and protection component is then output from the ingress edge. The output signal is transmitted to the switch core for switching to the appropriate egress edge.

The ingress edge serves to transform a number of input data streams into time-division-multiplexed (TDM) and dense-wavelength-division-multiplexed (DWDM) signals that can be sent to the switch core and switched to the appropriate egress edge. This is shown graphically in FIG. 4. In this figure, data is shown arriving at the ingress edge in a plurality of streams. Data from these streams is packaged in containers, which are then aggregated and organized for transport to the appropriate egress edge. Containers within any given time slot are converted to signals of different wavelengths, and these containers are multiplexed into a single, multiple-wavelength signal (which may be referred to as a "yottlet"). The yottlets are then transmitted to the switch core for switching to the appropriate edge.

As indicated above, one embodiment of a container switching system has a plurality of ingress edges connected to a plurality of corresponding input ports of a switch core. There are also a plurality of egress edges connected to a plurality of corresponding output ports of the switch core. The general flow of data is illustrated by FIG. 4. It should be noted that, in some embodiments, a pair of edges (i.e., an ingress edge and an egress edge) is combined in a single edge unit, so the physical structure may not be as illustrated in this figure.

An alternative embodiment differs from the previously described embodiment in that the "amplification and protection" component is replaced with an optional "amplification" component and the working and protect parts of the system are protected in a 1+1 fashion. That is, the working part of the system is protected by a copy which is redundant. In this embodiment, there are the following components per redundant copy: an optional edge data interface component, an edge adaptation and grooming component, a plurality of edge container processors, an edge container aggregation component, an edge amplification component, and an optical switch. All of the components operate bi-directionally, so that the edge unit functions as both an ingress edge and an egress edge.

The edge adaptation and grooming component is an STS1 crosspoint of dimension 128×144. The crosspoint dimension is sized according to the system bandwidth requirements. In the direction of data flow toward the switch fabric (i.e., as a component of the ingress edge), the edge adaptation and grooming component is used to distribute user data to the plurality of edge container processors, in effect mapping the user data to a timeslot and wavelength. In the direction of the system egress (i.e., as a component of the egress edge), the edge adaptation and grooming component is used to map the data received on a specific timeslot and wavelength to the appropriate egress output destination.

In the direction of data flow toward the switch fabric, the edge container processor holds the received data until it is time to convey the data toward the switch fabric. Before conveying the data, framing, header information, and an error correcting code are added, essentially encapsulating the user data and creating a container. The error correcting code is provided to allow data transmission errors to be corrected upon reception by a receiving edge container processor. According to the switching schedule, when it is time to send a container, the container is converted from the electrical domain to the optical domain at a unique optical frequency. The plurality of edge container processors associated with a specific edge perform this conversion in parallel, producing several containers, all at different wavelengths. In the direction of data flow exiting the switch fabric, the edge container processor receives the data, coverts it from the optical to the electrical domain, corrects errors in the received data using the error correcting code, and forwards the data to the edge adaptation and grooming component.

In the direction of data flow toward the switch fabric, the edge container aggregation component wavelength multiplexes the individual wavelength conveying containers into one optical fiber. In the direction of data flow exiting the switch fabric, the edge container aggregation component demultiplexes the wavelengths transported with a single fiber into a plurality of fibers.

The edge amplification and protection component provides optional optical signal amplification for the flow of data in both ingress and egress directions. In other words, it optionally provides amplification after the individual wavelengths are multiplexed together, as well as optionally providing amplification before the multi-wavelength signal is demultiplexed into individual wavelengths.

Figure 6:
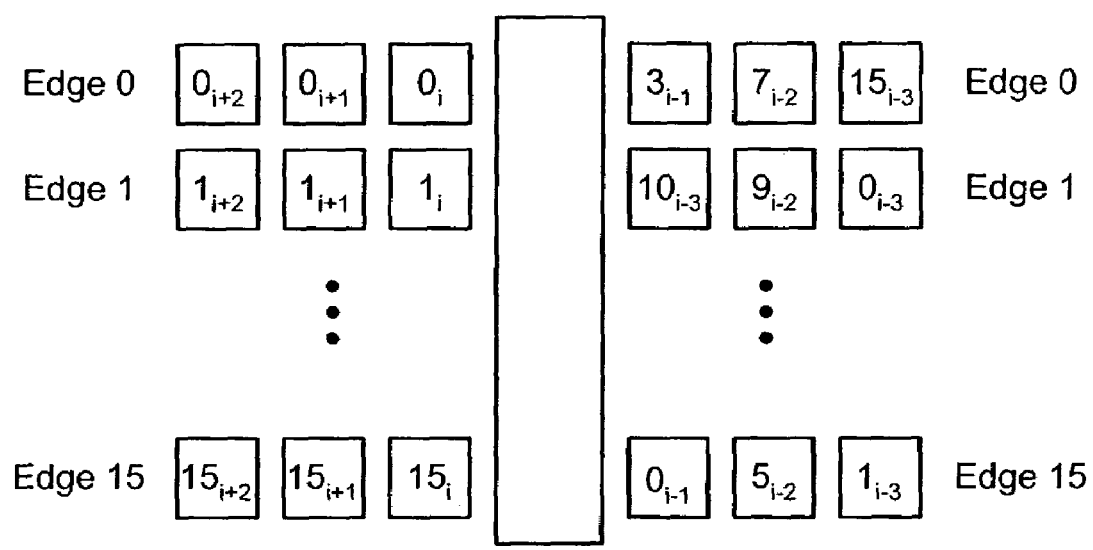
FIG. 6 is a diagram illustrating the switching of individual containers of data in one embodiment.

Referring to FIG. 6, a diagram illustrating the switching of individual containers of data in one embodiment is shown. It can be seen in this figure that there are 16 ingress edges (numbered 0-15) and 16 egress edges (also numbered 0-15). The containers generated by each ingress edge are designated by the edge number (e.g., 0 for ingress edge 0). The subscript of each container's identifier indicates the timeslot in which the container is switched through the switch core. Thus, all of the containers having a given subscript are simultaneously switched through the switch core. The switch core is configured such that switching of the containers is non-blocking.

It can be seen that successive containers of a particular ingress edge can be switched to different egress edges, and successive containers received at a particular egress edge can originate at different ingress edges. For example, as shown in FIG. 6, egress edge 0 receives successive containers from ingress edges 15, 7 and 3. The schedule is repeated every 125 microseconds in the preferred embodiment, although it may be changed from time to time.

After each yottlet is switched through the switch core from a particular ingress edge to a particular egress edge, the signal is deconstructed in a reverse of the process carried out in the ingress edge. In other words, it is wavelength-demultiplexed, then the single-wavelength containers are sent to the appropriate edge container processors, where they are deconstructed into frames of data that are sent through the edge adaptation and grooming component to form the exiting data streams. This process is carried out in the egress edge (which may reside in an edge unit with an ingress edge). The details of the deconstruction process carried out in the egress edge can be easily derived from the foregoing description of the ingress edge.

It should be noted that, in the preferred embodiment, the various components of the edges may include redundant components, so that if one fails, the process can be continued using the redundant component. This holds true for the switch core as well. Thus, in one embodiment, each edge unit contains two edge adaptation and grooming components (one of which is redundant), twenty edge container processors (one of which provides protection for the others), two edge container aggregation components and two edge amplification and protection components (where one of each is redundant).

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method comprising:
at an ingress edge:
receiving one or more data signals, wherein each data signal contains data segments having different destinations;
grouping the data segments by destination;
formatting the data segments having a common destination or same destinations into containers;
accumulating the containers in time slots defined by a predetermined switching schedule;
converting containers within a given time slot into optical signals of different wavelengths;
multiplexing the optical signals of different wavelengths into a multiple-wavelength optical signal; and
transmitting the multiple-wavelength optical signal to an optical switch core in corresponding time slots defined by the predetermined switching schedule.

2. The method of claim 1, wherein formatting the data segments comprises adding framing, header information and an error correcting code.

3. The method of claim 1, further comprising switching segments of the multiple-wavelength optical signal corresponding to time slots through the optical switch core to their respective destinations in accordance with the predetermined switching schedule.

4. A method comprising:
receiving one or more data signals, wherein each data signal contains data segments having different destinations;
grouping the data segments by destination;
formatting the data segments having a common destination or same destinations into containers;
for each time slot in a switching schedule,
accumulating a plurality of containers having a common destination edge in the time slot;
transforming the plurality of containers within the time slot into a multiple-wavelength optical data signal;
transmitting multiple-wavelength optical data signals to an optical switch core in accordance with the switching schedule;
receiving the multiple-wavelength optical data signals, wherein each multiple-wavelength optical data signal includes a series of data segments, wherein successive ones of the data segments are destined for different destinations; and
optically switching the data segments to the corresponding destinations to which the data segments are destined.

5. The method of claim 4, wherein each of the data segments is associated with a time slot and wherein each of the data segments is switched to a destination corresponding to the associated time slot.

6. The method of claim 4, wherein the time slots are configured to repeat with a predetermined periodicity.

7. The method of claim 4, wherein the association of each time slot with a corresponding destination is defined by the switching schedule.

8. The method of claim 4, wherein optically switching the data segments comprises switching the data segments through one or more silicon optical amplifiers.

9. The method of claim 4, further comprising concurrently switching data segments from each of the multiple-wavelength optical data signals through one or more silicon optical amplifiers in a non-blocking manner.

10. An edge unit configured to be coupled to an optical switch core comprising:
a grooming component configured to receive a plurality of input data signals and to switch data segments within the input data signals to a plurality of container processors;
a plurality of container processors coupled to the grooming component, wherein each of the plurality of container processors is configured to:
format the data segments received from the grooming component into containers, wherein all of the data segments within a particular container are destined for the same egress edge or edges;
accumulate the containers in time slots defined by a predetermined switching schedule;
convert containers within a given time slot into optical signals of different wavelengths; and
a container aggregator optically coupled to the plurality of container processors, wherein the container aggregator is configured to multiplex the containers embodied in the optical signals of different wavelengths received from the plurality of container processors into a single multiple-wavelength optical signal.

11. The edge unit of claim 10, further comprising a plurality of edge data interfaces configured to receive the plurality of input data signals from one or more data sources and to provide the input data signals to the grooming component.

12. The edge unit of claim 10, further comprising an amplifier configured to receive the multiplexed multiple-wavelength optical signal from the container aggregator, to amplify the multiplexed multiple-wavelength optical signal, and to provide the amplified multiplexed multiple-wavelength optical signal as an output.

13. A system comprising:
at least one ingress edge configured to receive one or more input data signals, wherein each input data signal contains a plurality of data segments, wherein each ingress edge is configured to collect and format the data segments into a plurality of containers, each containing a series of data segments destined for a common egress edge or edges, and wherein each ingress edge comprises:
a grooming component configured to receive the one or more input data signals and to switch the data segments to appropriate container processors;
a plurality of container processors coupled to the grooming component, wherein each of the plurality of container processors is configured to:
format the data segments received from the grooming component into containers, wherein all of the data segments within a particular container are destined for the same egress edge or edges;
accumulate the containers in time slots defined by a predetermined switching schedule;
convert containers within a given time slot into optical signals of different wavelengths; and
a container aggregator optically coupled to the plurality of container processors, wherein the container aggregator is configured to multiplex the containers embodied in the optical signals of different wavelengths received from the plurality of container processors into a multiple-wavelength optical signal;
an optical switch core coupled to the at least one ingress edge, wherein the optical switch core is configured to receive and optically switch each of the containers embodied in the multiple-wavelength optical signal to at least one egress edge based upon a timeslot associated with each container and where successive ones of the containers are destined for different egress edges.

14. The system of claim 13, wherein the optical switch core is configured to switch multiple-wavelength signals to one or more egress edges in timeslots that correspond to the one or more egress edges, and wherein each egress edge is configured to demultiplex the multiple-wavelength signals into a plurality of single-wavelength containers.

15. The system of claim 13, wherein the optical switch core comprises a plurality of silicon optical amplifiers and is configured to switch each of the containers based upon the predetermined switching schedule, wherein the predetermined switching schedule defines a set of connections between ingress edges and egress edges for each timeslot.

16. The system of claim 15, wherein the set of connections between ingress edges and egress edges may be different for successive timeslots.

17. The system of claim 15, wherein each set of connections between ingress edges and egress edges defined by the predetermined switching schedule is non-blocking.

18. The system of claim 13, wherein each ingress edge comprises a plurality of buffers for holding the plurality of containers.

* * * * *